Patented Sept. 28, 1926.

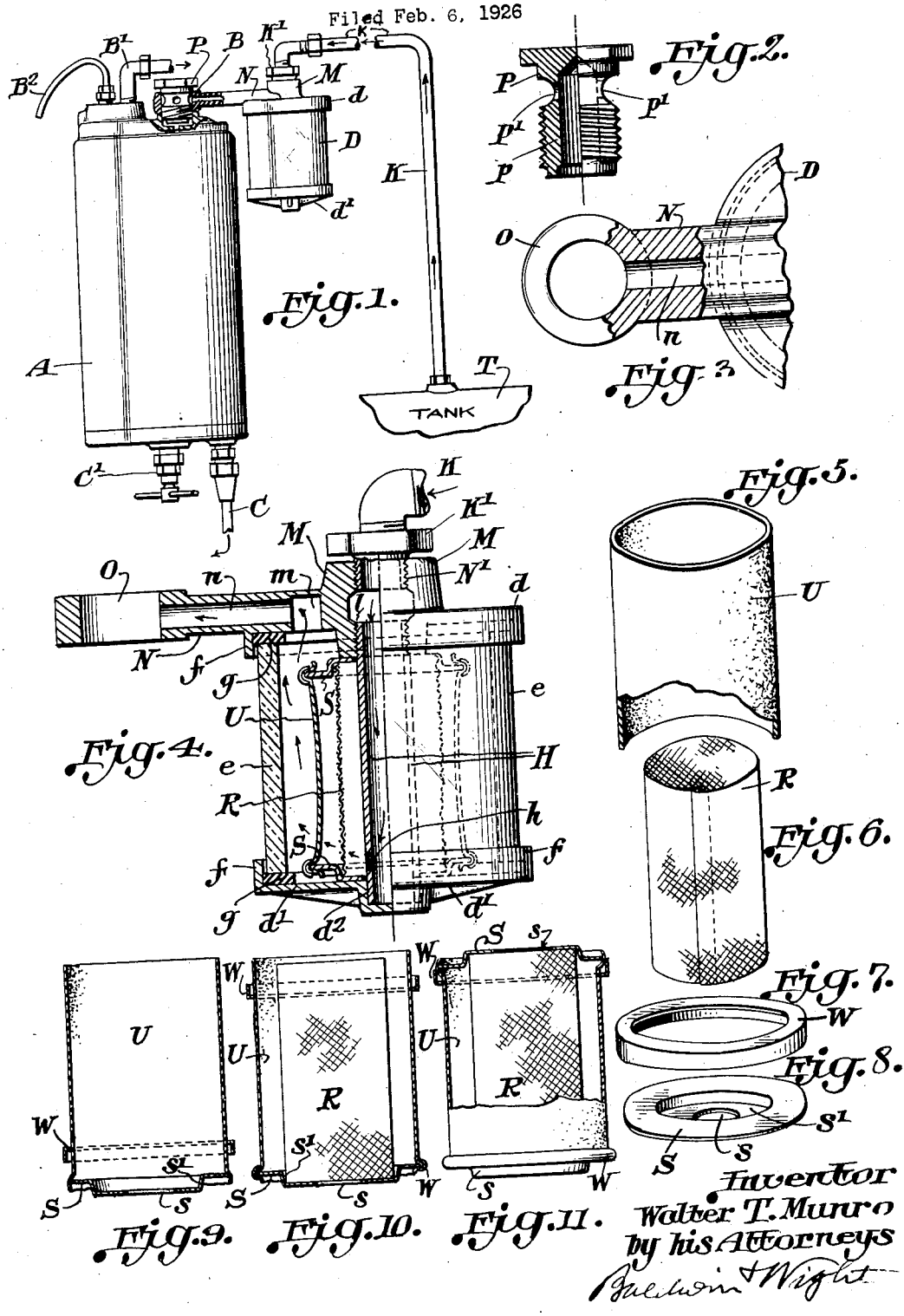

1,601,502

UNITED STATES PATENT OFFICE.

WALTER T. MUNRO, OF CRESTWOOD, NEW YORK.

FILTER FOR GASOLINE AND THE LIKE.

Application filed February 6, 1926. Serial No. 86,524.

This invention relates to filters of the kind employed for removing from gasoline and other like fuel oils foreign matter, such as particles of dirt and water before its delivery from a source of supply to the place of use and especially to filters interposed between a storage tank and the carbureter of an internal combustion engine or between a supply tank and a vacuum tank which in turn supplies the carbureter.

It is the common practice in automobiles to employ a relatively large storage or supply tank which delivers to what is known as a vacuum tank from which the fuel, such as gasoline is drawn by the engine. Ordinarily heretofore difficulties have been encountered owing to the presence of varying amounts of water, dirt, and other foreign matter which interferes with the most efficient operation of the engine.

In order to clarify the fuel oil, filters have been used which have been interposed between the supply or storage tank and the vacuum tank. My present invention relates to filters of this kind and it consists of certain improvements hereinafter designated whereby the filter may be readily applied to vacuum tanks of the kinds in general use and whereby it may be made more efficient and its cost materially reduced.

In carrying out my invention the filter is provided with a filtering member enclosed by a casing to which latter the fuel is delivered from the storage tank and from which it passes to the vacuum tank. The delivery from the filter casing is through an arm having a passage which connects with a plug support which holds a hollow plug or stopper which connects with the passage in the arm and is adapted to connect with the interior of the vacuum tank, the arrangement being such that the filter as a whole may be easily applied to vacuum tanks of the kind in common use.

The filtering member which is mounted within the casing comprises two discs spread apart by a strainer of fine wire gauze and a filtering element, such as chamois, which surrounds the gauze and is attached to the discs and which is adapted to arrest foreign matter, such as water, which is not caught by the gauze. The discs are formed with seats for the opposite ends of the gauze element, which define its position and means is provided for securely fastening the opposite ends of the chamois to the discs. The filtering member constructed as above specified, is so made that it may be readily mounted in or removed from the filter casing and replaced by a fresh one when necessary or desirable.

In the accompanying drawings:

Figure 1 is a view partly in side elevation and partly in section of a vacuum tank of well known construction, a filter embodying my invention, and a storage tank between which and the vacuum tank the filter is interposed.

Figure 2 is a view partly in side elevation and partly in section of a hollow plug which may be carried by the filter arm and which connects said arm with the vacuum tank.

Figure 3 is a detail view of the filter arm showing the plug support and also the passage extending from the interior of the filter casing to the plug support.

Figure 4 is a view on an enlarged scale partly in side elevation and partly in section of my improved filter.

Figure 5 is a view of the filtering element designed to arrest the passage of water or other foreign matter and which is preferably made of chamois.

Figure 6 is a view of the wire gauze element which arrests the passage of particles of dirt, etc.

Figure 7 is a perspective view of one of the fastening rings employed.

Figure 8 is a perspective view of one of the discs to which the filtering elements are attached.

Figures 9, 10 and 11 illustrate how the parts are assembled.

In Figure 9 I have indicated how the lower disc is positioned in the chamois filtering element and how the fastening ring is used to attach the lower end of the chamois to the lower disc.

Figure 10 indicates how the ring is tightened on the chamois and disc to hold the chamois securely on the disc. This figure also illustrates how the wire gauze cylinder is positioned inside the chamois and it indicates the top ring which is employed in the combination.

Figure 11 illustrates how the top disc is applied, how it is positioned by the wire gauze cylinder, and how the fastening ring is made to securely attach the upper end of the chamois to the upper disc.

It is quite important that the straining element should be of fine mesh and that the filtering element should be of chamois or of a material possessing the characteristics of chamois, the principal characteristic of which is that it will arrest the passage of water through it while permitting the passage of gasoline or similar fuel oil. It will be understood that when in this specification and in the claims I refer to chamois, I intend to include material having similar characteristics.

Referring to the drawings, the vacuum tank A is of a kind in general use and need not be described in detail. Its construction and operation is well known. Ordinarily the port B is directly connected with a storage tank T while the port C is ordinarily connected with the carbureter of an engine. A suction pipe is indicated at B', an air vent at B² and a drain is indicated at C'. These need not be further described as their construction and operation is well known.

In the use of my invention a filter D is interposed between the vacuum tank and the storage tank in order that foreign matter which would interfere with the operation of the engine may be eliminated.

The filter of my design is most clearly illustrated in Figure 4. It consists of upper and lower flanged heads $d$, $d'$ between which is interposed a spacing cylinder $e$ which is preferably but not necessarily made of glass. The glass cylinder is positioned by the flanges $f$ of the heads and gaskets $g$ are employed to provide a liquid tight and air tight fit between the cylinder and the heads. These members, i. e. the heads and the glass cylinder constitute the casing.

A tube H is arranged centrally within the casing and is secured firmly to the central portion of the lower head as indicated at $d^2$. It is imperforate at the side from top to bottom except by a single side opening $h$ near its lower end. The upper end of the tube is threaded as indicated at $l$ and it has a threaded engagement with a boss M formed on the upper head $d$. This boss is hollow and is coupled by a plug H to a pipe K leading to the storage tank T. The arrangement is such that gasoline or the like passes from the tank T through the filter D and thence to the vacuum tank. It passes down through the tube H, out through the opening $h$ and through the filtering elements soon to be described out through an opening $m$ in the upper head $d$, and then through a passage $n$ in the laterally projecting arm N which is provided at its outer end with what I call a plug support O. This support O is adapted to hold a plug P which may be of the construction shown most clearly in Figure 2. The plug is hollow; it has a threaded exterior $p$ and one or more lateral openings $p'$ which are adapted to coincide with the passage $n$ in the filter arm. It will be observed that when the plug is mounted in the plug support O and is secured to the vacuum tank in the manner indicated in Figure 1, there is a continuous passage from the interior of the vacuum tank through the filter to the storage tank. The filtering member as shown comprises upper and lower discs, a wire gauze strainer, a chamois filterer, and means for connecting these parts with each other. Each disc S shown in Figure 8 is formed with a central opening $s$ through which the tube H extends. A single wire gauze cylinder R is employed and a single cylinder of chamois U is used. The wire gauze cylinder should be of fine mesh and should fit accurately in the seats $s'$ of the discs. This cylinder should be of such length as to hold the discs the desired distance apart. The chamois U is of larger diameter than the gauze cylinder R but of substantially the same length. It is attached at its upper and lower ends to the edges of the disc by means of the rings W. In assembling the parts, I prefer to first position the lower disc S in the lower portion of the chamois cylinder. A flanged ring W is then applied and is bent around the chamois and the disc in the manner indicated in Figure 10. The wire gauze cylinder is then inserted and positioned and the upper ring W is threaded over the chamois. Next, the upper disc S may be applied to the upper end of the chamois and the upper end of the wire gauze cylinder seated in the upper disc. Then the flanged ring W may be bent around the upper portion of the chamois and the edge of the upper disc in the manner before explained and in the manner clearly illustrated in Figure 4. When the parts are thus assembled and secured together, a filtering member is provided which may be easily mounted in the filter casing and easily removed therefrom. From the foregoing it appears that the filtering member is a composite structure, that is to say it is made up or composed of a plurality of elements, adapted to be mounted upon and removed from the tube H, as a unit. While the life of the filtering member is quite long, there may be times when it is desirable to replace an old one by a fresh one. In order to mount the filtering member within the casing, the lower head $d'$ may be turned with the tube H until the threaded engagement of the tube with the boss M is broken. Then the lower member with the tube may be withdrawn with the casing member $e$ and the filtering member may be placed on the tube, and then the parts may be reassembled in obvious ways. There is no necessity for the use of a drain cock as in the operation of my filter such drainage is found to be unnecessary inasmuch as the filter is self-cleaning.

In operation, when the vacuum tank operates to draw fuel oil from the tank T, the oil flows through the pipe K and through the filter to the vacuum tank by means of the arm N and the plug P. The oil passes down through the tube H, out through the opening $h$, and into the space between the tube and the wire gauze cylinder. This latter serves to strain the oil or arrest the passage of particles of dirt, sand, rubber, and the like. The wire gauze cylinder, however, does not arrest the passage of water or other foreign liquid, but the passage of water through the filter is arrested by the chamois element of the filter, because while chamois will arrest the passage of water it will not arrest the passage of gasoline or similar oil. It is, therefore, a very desirable filtering element. The gasoline or similar oil which passes through the wire gauze and through the chamois, passes up through the port $m$ out through the passage $n$, through the plug to a vacuum tank where it is stored for use. When the vacuum is broken in the vacuum tank A, liquid flows in the longer vertical leg of the pipe K back to the storage tank, whereby a siphonic action is produced in the filter D. Due to this siphonic action, the filter D is drained, the liquid therein flowing back into the storage tank T. In other words, the flow of the liquid is reversed, the liquid passing through the chamois in the filter, through the wire gauze, through the port $h$, out through the tube H into the storage tank. In doing this, the chamois and the wire gauze are cleansed and the impurities returned to the storage tank. Due to the fact that the port $h$ is disposed as near as possible to the bottom of the filter D, the entire liquid contents of the said filter are drained off, whereby the entire exposed surfaces of both the chamois and the wire gauze are cleansed.

My improved filter has the advantage of simplicity of construction, it can be readily applied to vacuum tanks of various kinds at present in use, it is self-cleaning, requires no drainage device, and the filtering member proper can be inserted or removed from its casing expeditiously without permanently disturbing or disarranging other parts.

While the body of the casing $e$ is preferably made of glass, it is not necessary that a glass cylinder be used, as the casing may be made partly of glass and partly of metal or other material.

Should any leak occur in the fuel line between the gasoline filter and the storage tank, air would ordinarily be drawn through such leak and carried to the filter with the fuel. The percolation of air through the chamois would cause a very perceptible agitation and bubbling and thus an excellent means is provided for detecting defects or leaks in the gas line. The filter also is so constructed that it indicates any failure in the operation of the valves in the vacuum tank to function properly because when such failure occurs, fuel would not be drawn continuously from the storage tank to the vacuum tank and this defect in the operation of the valves would be indicated by observing the behavior of the liquid passing through the filter.

The plug K' which connects the filter with the supply pipe K is of the same size as the plug P above referred to. If desired, the plug P may be removed from the vacuum tank and the plug K' applied to the tank, thus making a direct connection between the storage tank and the vacuum tank, which is a connection usually made. Or if the storage tank is already connected to the vacuum tank by pipe K and plug K', my filter may be installed by simply transferring the plug K' to the filter and connecting the vacuum tank with the filter by means of the plug P which is made of the same size as the standard plug K' commonly used.

I claim as my invention:

1. A filter comprising a casing having inlet and outlet ports and composed of upper and lower heads and a cylindrical member held between said heads, a centrally arranged tube within the casing connected with said inlet port and which is rigidly secured to one of the heads and detachably connected with the other and which is provided with an outlet opening near its lower end, and a composite filtering member surrounding said tube and abutting against one of said heads, the other one of said heads being provided with a boss bearing against said filtering member to clamp the latter liquid-tight between said upper and lower heads, said filtering member being slidable on said tube and removable therefrom as a unit when one of said heads is withdrawn from the filter.

2. A filter comprising a casing having inlet and outlet ports and composed of upper and lower heads and a cylindrical member held between said heads, a centrally arranged tube within said casing having an outlet opening which is connected with said inlet port, and a composite filtering member within said casing surrounding said tube and abutting against one of said heads, the other one of said heads being provided with a boss bearing against said filtering member to clamp the latter liquid-tight between said upper and lower heads, said filtering member being slidable on said tube and removable therefrom as a unit when one of said heads is withdrawn from the filter.

3. In a fuel supply system for internal combustion engines, the combination with a low-level supply tank, of a vacuum tank, a closed chamber interposed between said tanks, a filtering element in said chamber dividing the same into two compartments, a siphon pipe leading from said supply tank to said chamber, said siphon pipe extending through the upper portion of said chamber into one of said compartments and being provided with an outlet disposed adjacent the lower edge of said filtering element, and a pipe connecting the other one of said compartments with said vacuum tank.

4. In a fuel supply system for internal combustion engines, the combination with a low-level supply tank, of a vacuum tank, a closed chamber interposed between said tanks, a siphon pipe leading from said supply tank to said chamber extending through the upper portion thereof and being provided with an outlet disposed adjacent the bottom of said chamber, a pipe connecting said chamber with said vacuum tank, and a filtering element in said chamber interposed between the outlet of said siphon pipe and the inlet to the pipe leading from said chamber to said vacuum tank.

5. In a fuel supply system for internal combustion engines, the combination with a low-level supply tank, of a vacuum tank, a closed chamber interposed between said tanks, a filtering element in said chamber dividing the same into two compartments, a connection between said supply tank and one of said compartments, and a connection between said vacuum tank and the other one of said compartments whereby suction is periodically created in said closed chamber, causing liquid to flow from said supply tank to said compartment, the connection between said closed chamber and said supply tank being so arranged that the entire contents of said chamber are caused to flow back into said supply tank when the vacuum ceases in said chamber, thereby cleaning said filtering element during the entire time that said closed chamber is being emptied.

6. The method of feeding filtered liquid hydro-carbon fuel to internal combustion engines, which consists in causing the fuel to pass through a filtering medium in a closed space between the supply tank and the vacuum tank of the engine, by the vacuum created in said vacuum tank, and permitting the fuel to be intermittently and wholly siphoned off from said closed space and to flow toward said supply tank, whereby the fuel is caused to pass through said filtering medium in a direction opposite to that in which it flows from the supply tank to the vacuum tank during the entire time that said closed space is being emptied.

7. The method of feeding filtered liquid hydro-carbon to internal combustion engines, which consists in causing the fuel to pass through a filtering medium in a closed space between the supply tank and the vacuum tank of the engine, and permitting the fuel to be intermittently and wholly siphoned off from said closed space to a level substantially to the lower level of the filtering medium and to flow toward said supply tank, whereby the fuel is caused to pass through the entire exposed surface of the filtering medium in a direction opposite to that in which it flows from said supply tank to the vacuum tank.

8. The method of feeding filtered liquid hydro-carbon fuel to internal combustion engines, which consists in causing the fuel to pass through a filtering medium in a closed space, and permitting the fuel to be intermittently and wholly siphoned off from said closed space and to flow toward said supply tank, whereby the fuel is caused to pass through the entire exposed surface of the filtering medium in a direction opposite to that in which it flows toward the engine.

9. The method of feeding filtered liquid hydro-carbon fuel to internal combustion engines, which consists in causing the fuel to pass by suction through a filtering medium in a closed space, and permitting the fuel to be intermittently and wholly siphoned off from said closed space, whereby the fuel is caused to pass through the entire exposed surface of the filtering medium in a direction opposite to that in which it flows toward the engine.

10. The method of feeding filtered liquid hydro-carbon to an internal combustion engine, which consists in causing the fuel to pass through a filtering medium in a closed space by vacuum intermittently created in said closed space, and permitting the fuel to be intermittently and wholly siphoned off from said closed space, whereby the fuel is caused to pass through said filtering medium in a direction opposite to that in which it flows toward the engine.

In testimony whereof, I have hereunto subscribed my name.

WALTER T. MUNRO.